(12) United States Patent
Rauch

(10) Patent No.: US 6,431,117 B1
(45) Date of Patent: Aug. 13, 2002

(54) ANIMAL FEEDER

(76) Inventor: Steven Rauch, 31257 Via Puerta Del Sol, Bonsall, CA (US) 92003

( * ) Notice: Subject to any disclaimer, the term of this patent is extended or adjusted under 35 U.S.C. 154(b) by 0 days.

(21) Appl. No.: 09/569,406

(22) Filed: May 12, 2000

Related U.S. Application Data

(60) Provisional application No. 60/133,978, filed on May 13, 1999.

(51) Int. Cl.⁷ .................................................. A01K 1/10
(52) U.S. Cl. ........................................................ 119/58
(58) Field of Search ................................. 119/58, 59, 60

(56) References Cited

U.S. PATENT DOCUMENTS

| | | | |
|---|---|---|---|
| 195,351 A | | 9/1877 | Crabb .......................... 119/60 |
| 376,529 A | * | 1/1888 | Kline .......................... 119/60 |
| 564,788 A | * | 7/1896 | Hermany et al. ............. 119/60 |
| 727,925 A | * | 5/1903 | Faulkner ....................... 119/58 |
| 763,951 A | | 7/1904 | Bethea ...................... 119/60 X |
| 1,090,286 A | | 3/1914 | Crowell ........................ 119/60 |
| 1,146,108 A | | 7/1915 | Sharp ........................... 119/60 |
| 3,802,394 A | | 4/1974 | Mahler ....................... 119/51.5 |
| 4,294,197 A | | 10/1981 | Snel et al. .................... 119/60 |

* cited by examiner

*Primary Examiner*—Robert P. Swiatek
(74) *Attorney, Agent, or Firm*—Harness, Dickey & Pierce, P.L.C.

(57) ABSTRACT

An animal feeder for providing feed to animals includes a plurality of side and end walls defining an interior chamber. A perforated plate defines a bottom wall of the chamber and is moveable therein. A grate defines a top wall of the chamber and allows access to feed material contained in the chamber. A spring mechanism biases the plate toward the grate such that feed material located within the chamber is continuously provided to an animal feeding at the level of the grate.

27 Claims, 6 Drawing Sheets

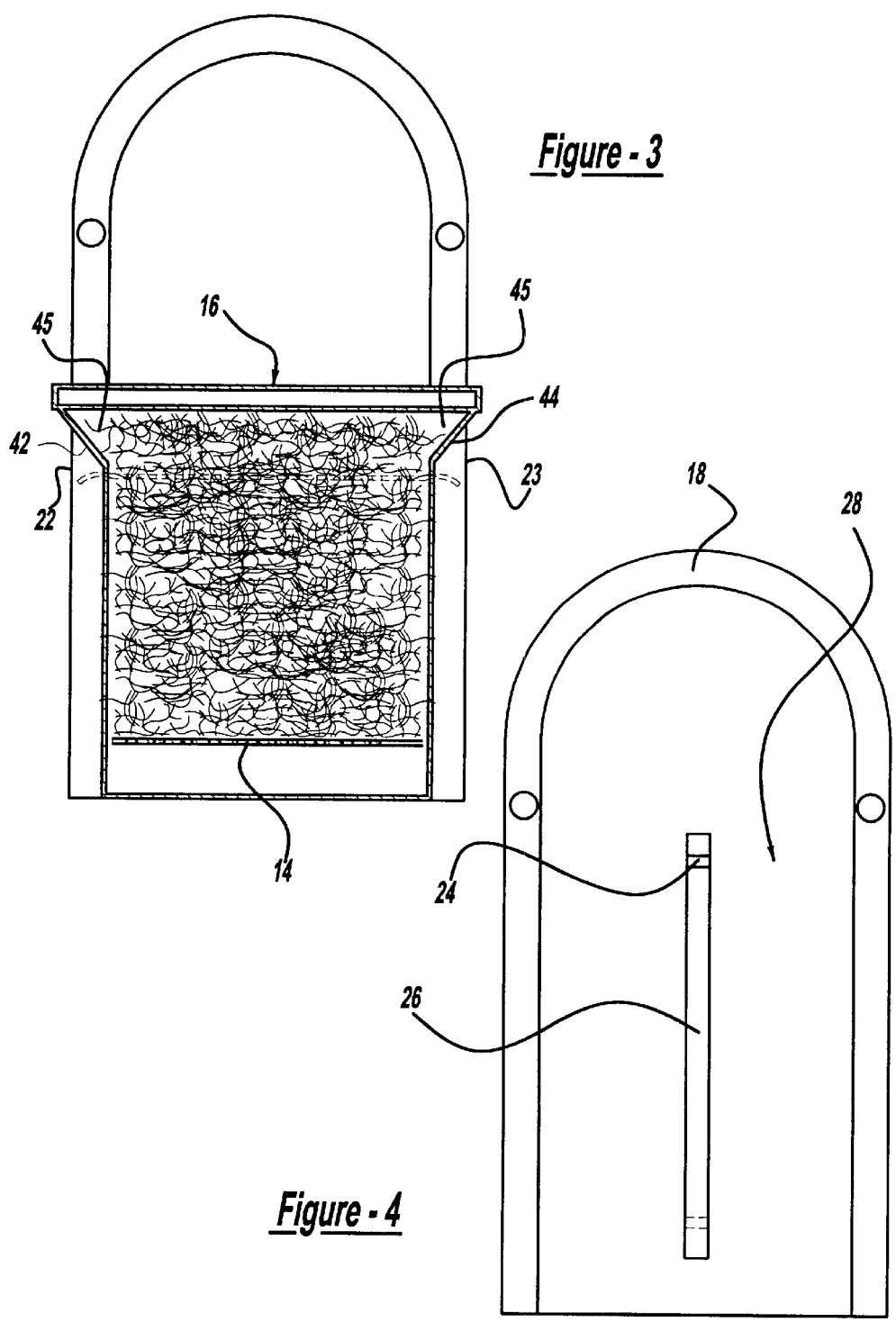

ANIMAL FEEDER

CROSS-REFERENCE TO RELATED APPLICATION

This application claims the benefit of U.S. Provisional Application No. 60/133,978, filed on May 13, 1999.

BACKGROUND OF THE INVENTION

1. Field of the Invention

The present invention relates to an animal feeder, and in particular, a feeder for continuous clean grazing.

2. Description of the Prior Art

Grazing in a field is a natural method for feeding farm animals. Throughout history, when grazing in a field was not easily available, animals (hereinafter "horses") have been fed in stalls or corrals with hay or other feed (hereinafter "hay") placed in a feed box and the horse is allowed to feed at its leisure. Such hay boxes are nothing more than a containment box with an open top, the opening allowing the horse to reach into the box from the top to get at the hay.

Several problems exist with this type of a hay box. First, a significant amount of hay inevitably spills onto the floor of the stall or ground. This loose hay results in a wasting of the hay as feed material, often results in the ingestion of contaminates by the horse as it eats hay from the floor of the stall, and creates additional work in cleaning the stall. An additional problem with prior hay boxes is that as the horse consumes the hay, the horse must continually reach further into the hay box to access the hay. Prior hay boxes also do not restrict the rate at which the horse can consume the hay. If hay is not continuously provided, the horse will often eat at an excessive rate when the hay is initially provided, resulting in potential digestion problems.

Improved devices for feeding horses were some of the earliest patented inventions. Initial horse feeders such as in U.S. Pat. No. 195,351 provided for a box with an adjustable bottom to move the food up to the top for the horse to feed so it wouldn't have to reach further and further down as it consumed hay. This device required manual adjustment of the bottom as the horse consumed the hay.

U.S. Pat. No. 763,951 had a spring attached to the bottom of the surface the hay sat on so it would raise as the horse ate. However there was no way to determine, until the hay was gone, how much was left in the box because it was fully enclosed. Further, the bottom surface of the feeder was solid so contaminants, such as sand or gravel were trapped on the bottom surface and consumed by the animal.

A further feeder was described in U.S. Pat. No. 1,090,286, which had springs at the top pulling up the feeder as the animal ate the feed. This feeder has the same issues with contaminants and non-visibility of the feed level as U.S. Pat. No. 763,951. Further, it provided no attachment method to a stall wall so the horse could knock it over and eat freely from the floor, thereby consuming contaminants.

U.S. Pat. No. 4,294,197 described a horse feeder that could attach to the wall so the horse could not knock it over. However, the feeder was permanently attached to that wall and the bottom surface was still solid, causing contaminants to collect at the bottom of the food supply where the horse might still consume them.

From the above discussion, it is clear that the need exists for a hay feeder, which overcomes the above and other limitations of prior hay boxes. It is therefore a primary object of this invention to fulfill that need by providing a device which allows horses to graze on clean hay from a container maintained at a consistent height and which simulates grazing while the horse is contained.

SUMMARY OF THE INVENTION

Briefly described, these and other objects are accomplished according to the present invention by providing an adjustable spring-loaded hay grazing feeder that maintains the hay at a constant level for the horse to graze on, contains a pressure plate which is perforated to allow sand and other contaminants to fall out of the feeder, has a slot in the side to allow viewing of the amount of hay in the feeder, contains a removable grate so the opening size can be changed for different size horses (e.g. foals, draft horses), has mounting brackets that secure to various walls so the unit is portable and contains an anti-jamming feature by using flared walls at the top.

Additional benefits and advantages of the present invention will become apparent to those skilled in the art to which the present invention relates from the subsequent description of the preferred embodiments and the appended claims, taken in conjunction with the accompanying drawings.

BRIEF DESCRIPTION OF THE DRAWINGS

FIG. 3 is a side view of the hay feeder, taken substantially along line 3—3 of FIG 1;

FIG. 4 is a side view of the hay feeder;

DETAILED DESCRIPTION OF THE PREFERRED EMBODIMENT

Figure 1:
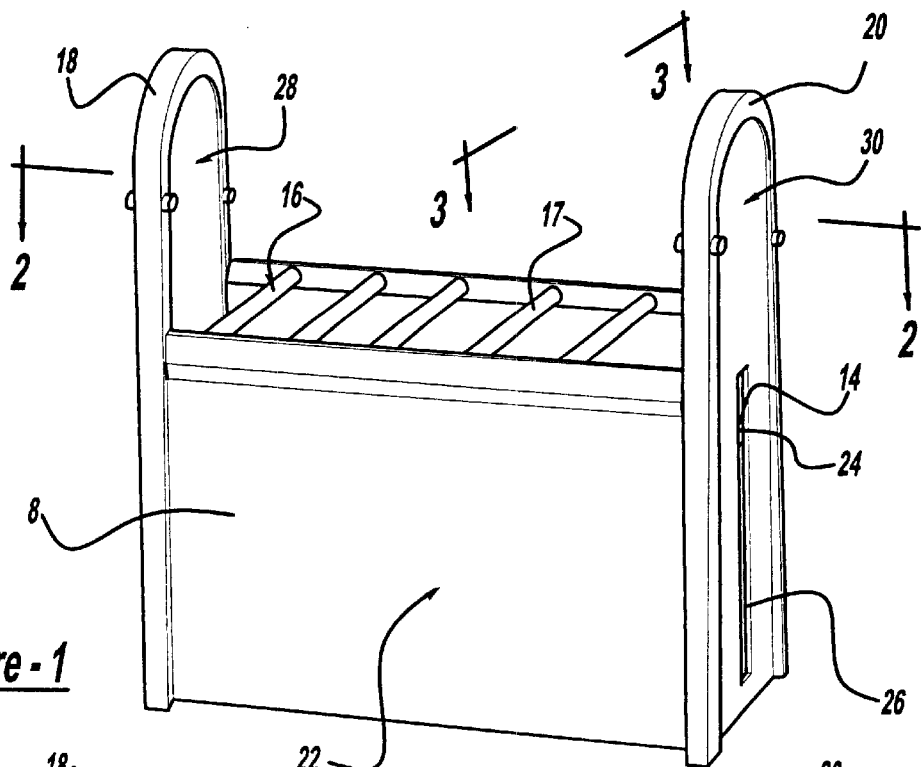
FIG. 1 is a perspective view of the hay feeder.

Referring now in detail to the drawings, perspectively shown in FIG. 1 is the hay feeder 8 according to the present invention. The hay feeder 8 consists of opposing side walls 22 and 23 and opposing end walls 28 and 30 with slots 26 cut in them, all supported by corner members 18 and 20. A removable grate 16 that the horse feeds through is attached to the corner members through attaching pins 32 by a method that will be described later. The hay fits between the grate 16 and a pressure plate 14, which is the bottom surface of the hay feeder 8.

Figure 2:
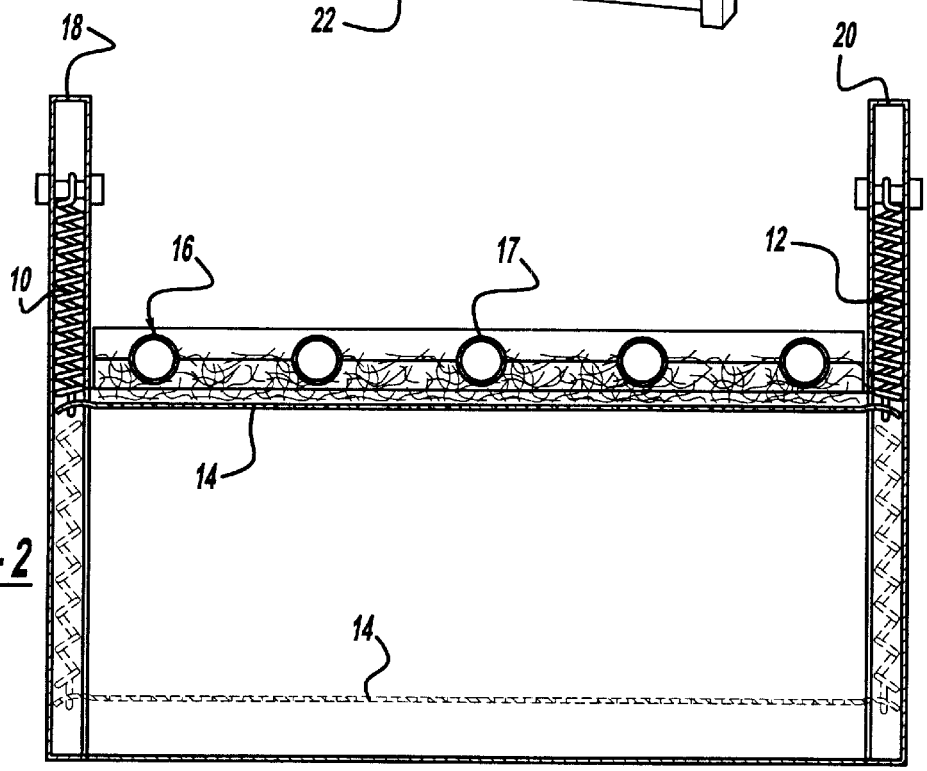
FIG. 2 is a front view of the hay feeder, taken substantially along line 2—2 of FIG

The pressure plate 14 is better shown in FIG. 2 where the connection to the springs 10 & 12 is demonstrated. A spring 10,12 is attached at its bottom to each corner of the pressure plate 14. The springs 10 and 12 are located within opposing legs of the corner members 18 and 20 and are secured at their top to the corner members 18 and 20. When there is no force on the pressure plate 14, the springs 10 and 12 are in their relaxed condition generally as shown in the main view of FIG. 2. The shadowed view of FIG. 2 shows the springs 10 and 12 fully extended and the pressure plate 14 near the bottom of the hay feeder 8 as if a full flake of hay were inserted into the hay feeder 8. The hay flake would be compressed between the pressure plate 14 and the grate 16.

As the horse fed, the pressure plate 14 would rise closer to the grate until the hay feeder 8 was empty of hay.

Figure 6:
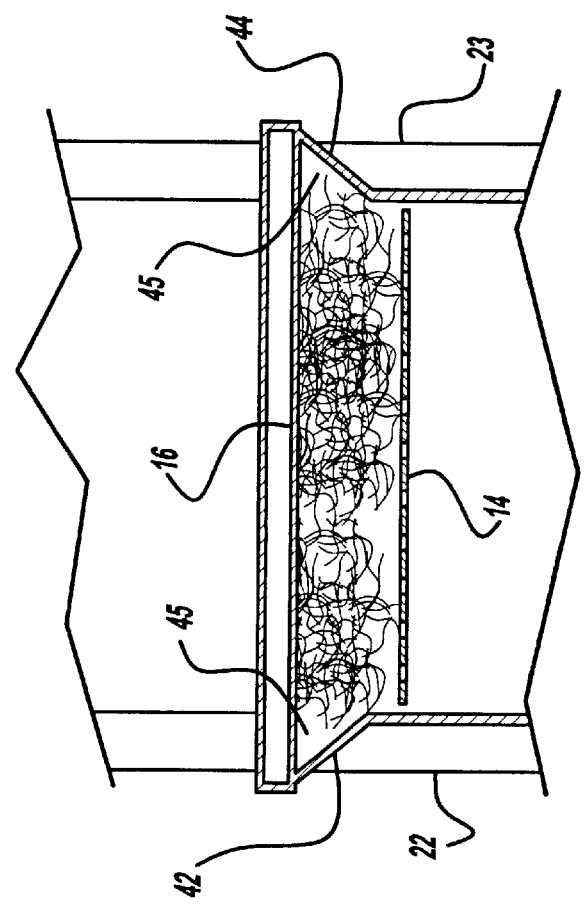
FIG. 6 is an enlarged view of FIG. 2, illustrating the flare at the top of the hay feeder.

One condition that might prevent the hay from rising towards the grate 16 to allow the horse continuous feeding would be if hay, which the animal could not reach, built up beneath the cross members 17 of the grate 16 at the interior edges of the side walls 22 and 23. The prevention of this potential condition is shown in FIG. 3 where the side walls 22 and 23 flare 42 and 44 outwardly. By flaring outwardly, the hay feeder 8 provides an open space 45 between the side walls 22 and 23 and the hay itself. Because of the composition of the hay, the hay does not expand outward to fill these spaces 45 as it is forced upward. The spaces 45 therefore provides an area allowing the horse to get behind hay at the sides of the hay feeder 8 and eliminate build-up at the side walls 22 and 23 and grate 16 interface and allow the pressure plate 14 to rise. FIG. 6 demonstrates the flares 42 and 44 and spaces 45 in the side walls 22 and 23 in an expanded view.

A further concern with the hay level in the hay feeder 8 might be that the hay feeder 8 would be empty of hay before the operator would know to refill it. This could lead to extended periods of time where the animal would have no hay. This condition has been prevented by slots 26 cut into the end walls 28 and 30 as shown in FIG. 4. The hay and the side surface 24 of pressure plate 14 can be viewed through the slot 26. When the hay is nearly empty, the side surface 24 will be nearer to the top of the slot 26 as can be seen in the main view. The shadowed view shows the side surface 24 near the bottom of slot 26, indicating a nearly full hay feeder 8. This will give the operator warning as to when the feed is getting low so it never needs to be empty.

When the feed is empty, the hay flake is inserted through the top of the hay feeder 8. The grate 16 can be opened from either side of the hay feeder 8 or completely removed to accomplish loading of the hay flake. The attachment of the grate 16 to the corner members 18 and 20 is demonstrated in FIG. 5. The grate 16 attaches to the corner members 18 and 20 by way of four engaging pins 32 which fit into holes 82, 84, 86 and 88 in the interior of the corner members 18 and 20 or end walls 28 and 30. The engaging pins 32 are held to the grate 16 by way of flanges 36 and 38 with the engaging pins 32 inserted through and interacting with coil springs 34 located between the flanges 36 and 38. The springs 34 act to bias the engaging pins 32 into the holes 82, 84, 86 and 88. In this embodiment, a bent end 40 is provided on the inboard end of the engagement pins 32 for easy access to move the engagement pins 32. The four engagement pins 32 are placed so that any two end-to-end opposing engagement pins 32 may be released from the holes (either 84 and 88 or 82 and 86) allowing the grate 16 to be opened from either side (pivoting about the still engaged pins 32) for loading a hay flake. The grate 16 is also easily fully removable by releasing all the engaging pins 32 for cleaning or replacing with a grate with wider or narrower spacing between cross-members 17 for different sized horses (foals, draft horses, etc.). After the hay flake is installed, the grate is replaced, the engaging pins 32 are all inserted into holes 82, 84, 86 and 88, locking the grate 16 in place and making the hay is ready for the horse to consume.

Figure 5:
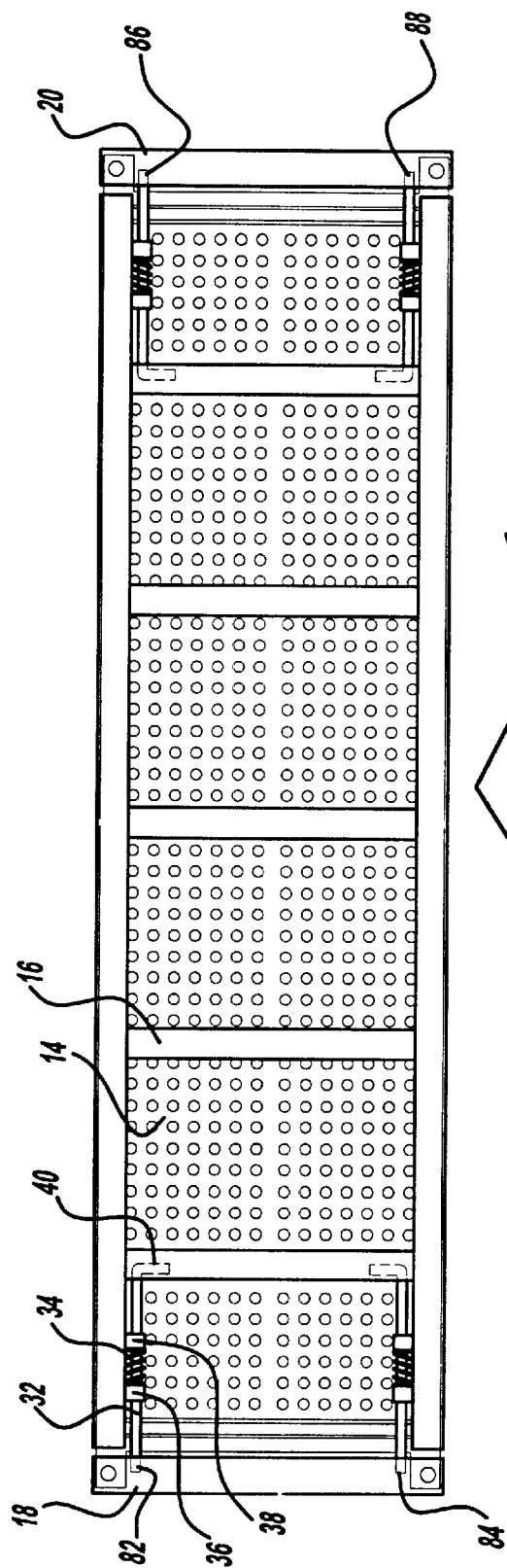
FIG. 5 is a top view of the hay feeder.

Through the grate 16, the detail of the perforated holes in the pressure plate 14 can be seen in FIG. 5. This allows sand and other contaminants to drop out of the hay feeder prior to the horse consuming them.

Figure 7:
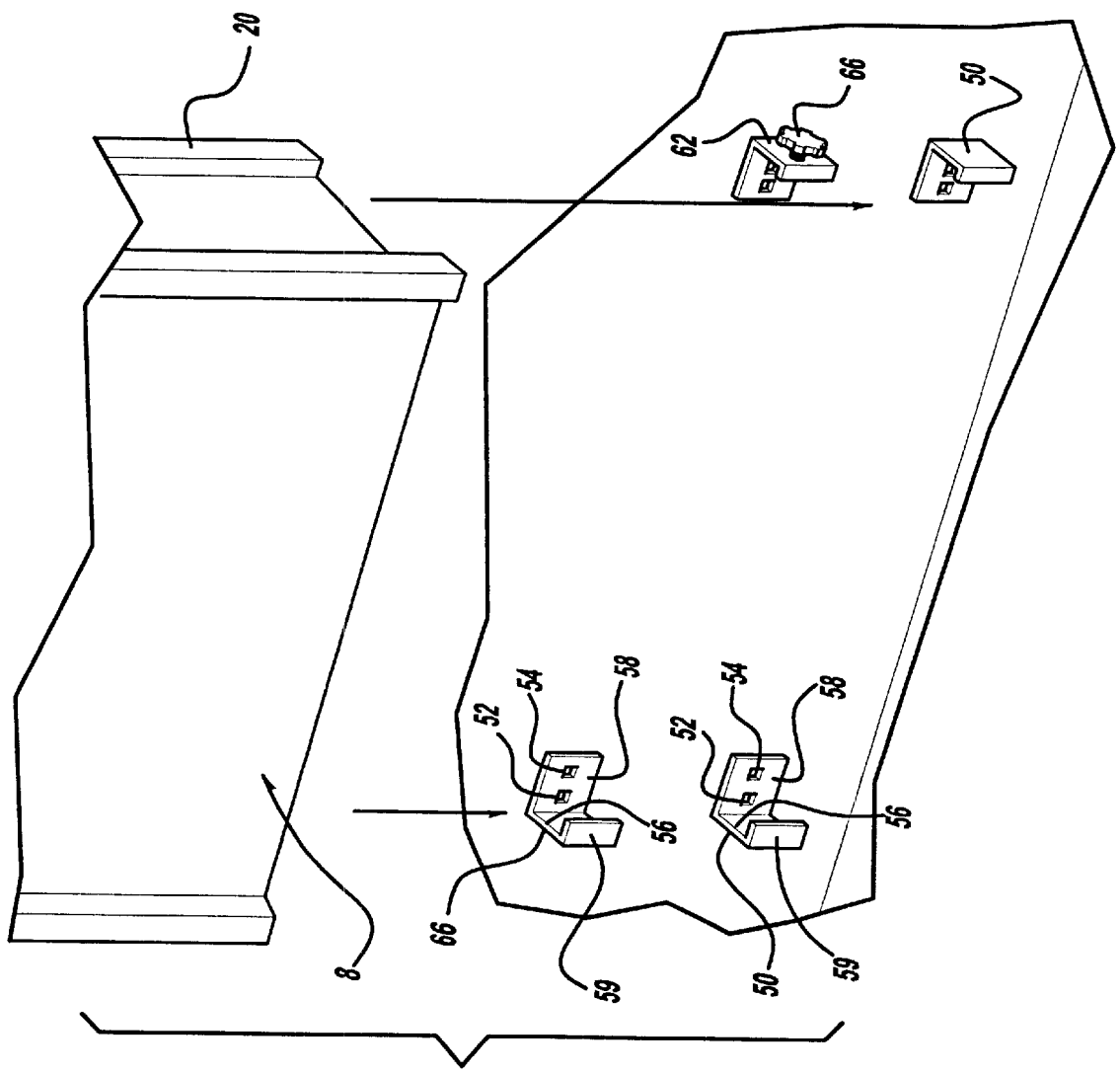
FIG. 7 is a perspective view of the attaching brackets prior to mounting.

After the hay flake is inserted and the grate 16 is closed, there is still the risk that the horse might knock over the hay feeder, thus contaminating the hay. Bottom attaching brackets 50 and top attaching brackets 62 are shown in FIG. 7. Fasteners are inserted through holes 52 and 54 in rear legs 58 to attach the brackets 50 and 62 to a stall, trailer or other surface wall to prevent the horse from knocking over the hay feeder 8 and contaminating the hay. The corner members 18 and 20 of the hay feeder 8 slide into these attaching brackets 50 and 62 from above and the corner members 18 and 20 are captured by side legs 56 and front legs 59 of the attaching brackets 50 and 62, securing the hay feeder 8 to a solid wall surface so a horse can not knock it over. For additional security, knobs 66 are positioned on the top attaching brackets 62 by threaded fasteners protruding from the inboard side of the knobs 66 through the brackets 62. As the knobs 66 are turned clockwise, the threaded fasteners further protrude inward and contact the corner members 18 and 20 to prevent any looseness in the attachment of the hay feeder 8 to the brackets 62. Multiple sets of brackets may be installed in various locations such as a stall and a horse trailer and the hay feeder can be carried to each location to reduce duplicative costs.

Figure 8:
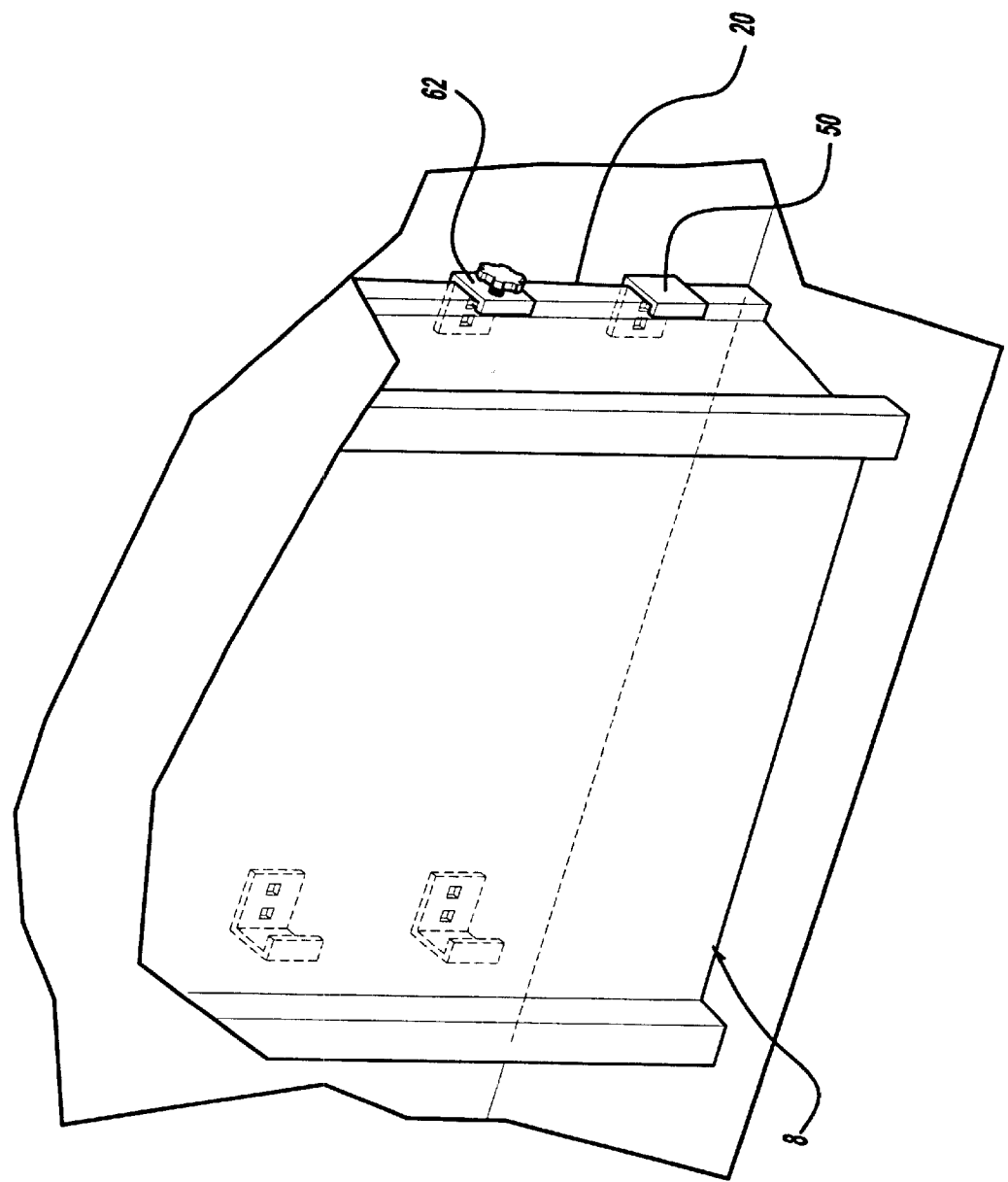
FIG. 8 is a perspective view of the attaching brackets after mounting of the hay feeder.

The hay feeder 8 is shown secured to a wall surface in FIG. 8. The corner members 18 and 20 have been inserted down through the brackets 50 and 62 and the hay feeder 8 cannot be knocked over by the horse, thus keeping the feed accessible and clean.

Figure 9:
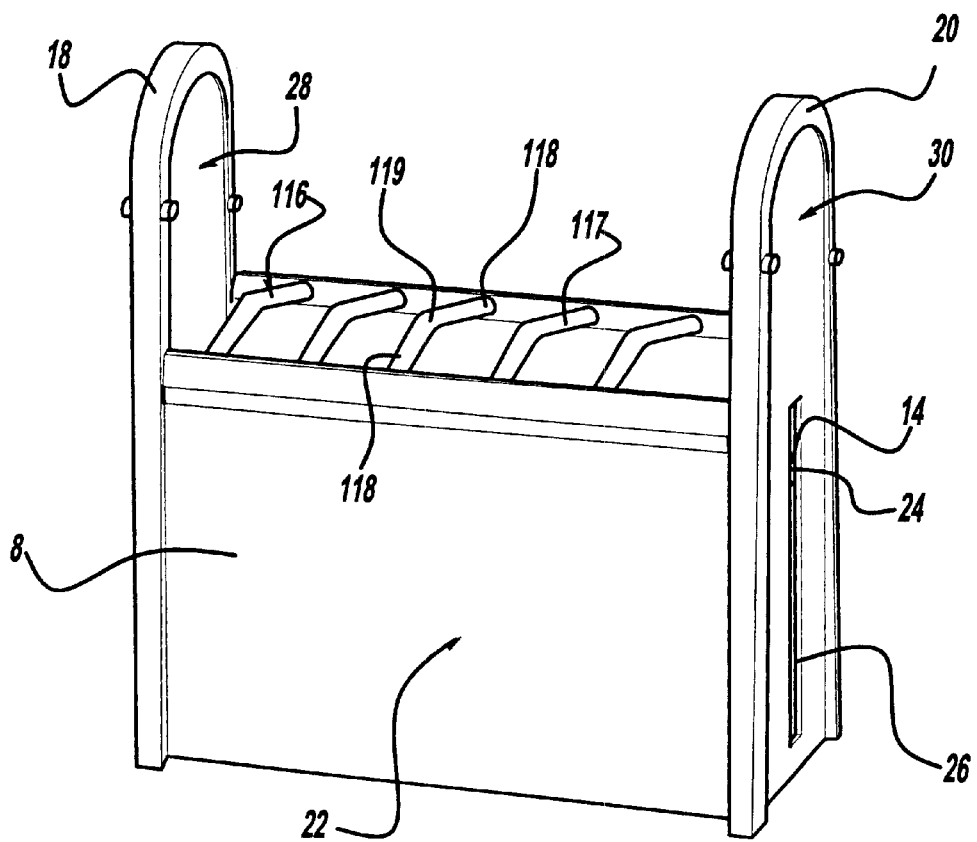
FIG. 9 is a perspective view of a second embodiment of the hay feeder.

A further embodiment of the invention is illustrated in FIG. 9, where like reference numerals are used to identify corresponding or the same elements in the previously discussed embodiment.

This embodiment differs in that the cross members 117 of the grate 116 are not straight throughout their length, as in the embodiment of FIG. 1. Rather, between the opposing ends 118 of the cross members 117, a central portion 119 is upwardly raised or peaked relative to the ends 118. This provides the cross members 117 with a bend between the ends 118.

As the hay is urged upward by the pressure plate 14, contact with the upward slope of the cross members 117 will cause the hay to move toward the centerline of the hay feeder 8, as defined by the peak of the central portions 119. This further insures that hay does not build up beneath the grate 116 because the horse cannot obtain hay immediately adjacent to the side walls 22, 23. Cross members 117 of this variety may be used with or without the flares 44 discussed above. Preferably, they are used with the flares 44.

While the above description constitutes the preferred embodiments of the present invention, it will be appreciated that the invention is susceptible to modification, variation and change without departing from the proper scope and fair meaning of the accompanying claims.

What is claimed is:

1. An animal feeder, comprising:
   a feed box having a height first portion having a first width extending at least one-half the height of said feed box, and a second portion flared relative to said first portion and having a second width which is greater than said first width, said feed box defining an interior chamber and an opening adjacent said second portion;
   a plate disposed within said feed box and movable within said interior chamber;
   a grate covering said opening; and
   a spring mechanism operably coupled between said plate and said feed box, said spring mechanism biasing said plate towards said grate.

2. A animal feeder according to claim 1 wherein said grate comprises cross members spaced relative to one another to prevent the insertion of the muzzle of the animal intended to be fed thereby into said feed box.

3. The animal feeder according to claim 2 wherein said cross members having opposing ends and a central portion, said central portion being raised relative to said ends.

4. The animal feeder according to claim 2 wherein said cross members are not straight throughout their lengths.

5. The animal feeder according to claim 2 wherein said cross members exhibit a bend.

6. A animal feeder according to claim 1 wherein said plate is perforated with a plurality of openings therein, said openings being of a size permitting the passage of non-feed debris out of the interior chamber while preventing the passage of the feed material therethrough.

7. A animal feeder according to claim 1 further comprising a plurality of attaching brackets, said brackets including a mounting portion having a generally upright surface with means for mounting said brackets via fasteners to a generally upright secure surface, said brackets also including an attachment portion correspondingly shaped to slidingly receive said animal feeder thereinto, said brackets preventing the animal from knocking the feeder over, but allowing portability and installation of said animal feeder to various locations while only requiring multiple sets of said brackets.

8. A animal feeder according to claim 7 wherein said attachment portion slidingly receives said animal feeder in a generally vertical direction.

9. The animal feeder according to claim 7 wherein said brackets further include a positive retaining member engagable with said animal feeder.

10. The animal feeder according to claim 9 wherein said retaining member includes a threaded member engagable with said animal feeder, said threaded member received within a threaded bore defined in said attachment portion of said bracket.

11. The animal feeder according to claim 9 wherein said retaining member includes a knob for disengaging said retaining member from said animal feeder.

12. The animal feeder according to claim 1 wherein said grate is completely removable therefrom.

13. The animal feeder according to claim 1 wherein said grate is secured thereto by at least one hinge mechanism.

14. The animal feeder according to claim 1 wherein said grate is secured thereto by a plurality of hinge mechanisms.

15. The animal feeder according to claim 14 wherein said hinge mechanisms are on opposing sides of said grate.

16. The animal feeder according to claim 14 wherein said hinge mechanisms are releaseable to permit opening of said grate.

17. The animal feeder according to claim 14 wherein said hinge mechanisms are releasable to alternatively permit opening of said grate from opposing sides of said animal feeder.

18. The animal feeder according to claim 14 wherein said hinge mechanisms connect said grate to said end walls.

19. The animal feeder according to claim 14 wherein said hinge mechanisms are spring biased.

20. The animal feeder according to claim 19 wherein each of said plurality of hinge mechanisms includes a pin which is spring biased into an opening formed in said feed box.

21. The animal feeder according to claim 1 wherein said feed box comprises a plurality of walls, at least one of said plurality of walls having an upper wall portion flared outwardly adjacent said upper opening.

22. The animal feeder according to claim 21 wherein two of said plurality of walls are flared outwardly at a top portion thereof adjacent to said grate.

23. The animal feeder according to claim 22 wherein said side walls include a top portion having an outward flare relative to a remainder of said side walls.

24. The animal feeder according to claim 1 wherein said grate comprises a peaked grate.

25. The animal feeder according to claim 1 further comprising a plate position indicator.

26. The animal feeder according to claim 25 wherein said plate position indicator comprises a slot formed in said feed box such that a portion of said plate is visible through said feed box.

27. An animal feeder comprising:
   a feed box defining an interior chamber and an opening;
   a plate disposed within the feed box and movable within the interior chamber;
   a peaked grate covering said opening; and
   a spring mechanism operably coupled between said plate and said feed box, said spring mechanism biasing said plate towards said grate.

* * * * *